United States Patent
Koda

(10) Patent No.: US 9,762,751 B2
(45) Date of Patent: Sep. 12, 2017

(54) IMAGE FORMING APPARATUS EXECUTING A JOB BASED ON A JOB REQUEST AND LOGOUT METHOD

(71) Applicant: KYOCERA Document Solutions Inc., Osaka (JP)

(72) Inventor: Isao Koda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/195,193

(22) Filed: Jun. 28, 2016

(65) Prior Publication Data

US 2016/0381235 A1    Dec. 29, 2016

(30) Foreign Application Priority Data

Jun. 29, 2015   (JP) ................... 2015-130175

(51) Int. Cl.
*H04N 1/00* (2006.01)

(52) U.S. Cl.
CPC ..... *H04N 1/00068* (2013.01); *H04N 1/00015* (2013.01); *H04N 1/00726* (2013.01); *H04N 2201/0094* (2013.01)

(58) Field of Classification Search
CPC .......... H04N 1/00068; H04N 1/00015; H04N 1/00726; H04N 2201/0094
See application file for complete search history.

(56) References Cited

U.S. PATENT DOCUMENTS

| 2008/0170258 A1* | 7/2008 | Yamamura | G06F 1/3203 358/1.15 |
| 2010/0231963 A1* | 9/2010 | Oda | G03G 15/5012 358/1.15 |

FOREIGN PATENT DOCUMENTS

JP    2007-249417    9/2007

* cited by examiner

*Primary Examiner* — Iriana Cruz
(74) *Attorney, Agent, or Firm* — Studebaker & Brackett PC

(57) ABSTRACT

An image forming apparatus includes: a tray on which at least one sheet is loaded; a sensor and a controller. The sensor measures overall weight of the sheet loaded on the tray. The controller calculates decrement from the overall weight measured by the sensor upon completion of a job. The controller calculates total weight of the sheet loaded on the tray through execution of the job. The controller executes a logout process based on the decrement and the total weight.

9 Claims, 9 Drawing Sheets

IMAGE FORMING APPARATUS EXECUTING A JOB BASED ON A JOB REQUEST AND LOGOUT METHOD

INCORPORATION BY REFERENCE

The present application claims priority under 35 U.S.C. §119 to Japanese Patent Application No. 2015-130175, filed Jun. 29, 2015. The contents of this application are incorporated herein by reference in their entirety.

BACKGROUND

This disclosure relates to an image forming apparatus and a logout method.

Some models of image forming apparatuses include an authentication process function intended to maintain security. To use the image forming apparatus including the authentication process function, a user performs login operation to execute the authentication process. In the login operation, the user inputs, for example, a login ID (identifier) and a password. The user who has succeeded in the authentication process can use a function of the image forming apparatus to execute a desired process. Then after completion of the desired process, the user performs logout operation. This permits suppression of use of the image forming apparatus by any user who has not executed the authentication process. As a result, security for the image forming apparatus can be maintained. However, the user may forget to perform the logout operation in sonic cases. In this case, after the user who has forgotten to perform the logout operation leaves from the image forming apparatus, another user who has not performed the authentication process may use the image forming apparatus. Thus, a technology of suppressing diminished security attributable to forgetting to perform the logout operation by the user has been suggested.

For example, some image forming apparatuses include an automatic logout function. With the automatic logout function, in a case where operation of an operation section by the user (input operation) is not performed within time limit, the logout process is forcibly executed.

SUMMARY

An image forming apparatus of this disclosure executes a job based on a job request. This image forming apparatus includes: a tray on which at least one sheet is loaded; a sensor; and a controller. The sensor measures overall weight of the sheet loaded on the tray. The controller calculates decrement from the overall weight measured by the sensor upon completion of the job. The controller calculates total weight of the sheet loaded on the tray through the execution of the job. The controller executes a logout process based on the decrement and the total weight.

A logout method includes: loading at least one sheet on a tray through job execution; measuring overall weight of the sheet loaded on the tray upon completion of the job; calculating total weight of the sheet loaded on the tray through the execution of the job; calculating decrement from the overall weight; and executing a logout process based on the decrement and the total weight.

DETAILED DESCRIPTION

Figure 1:
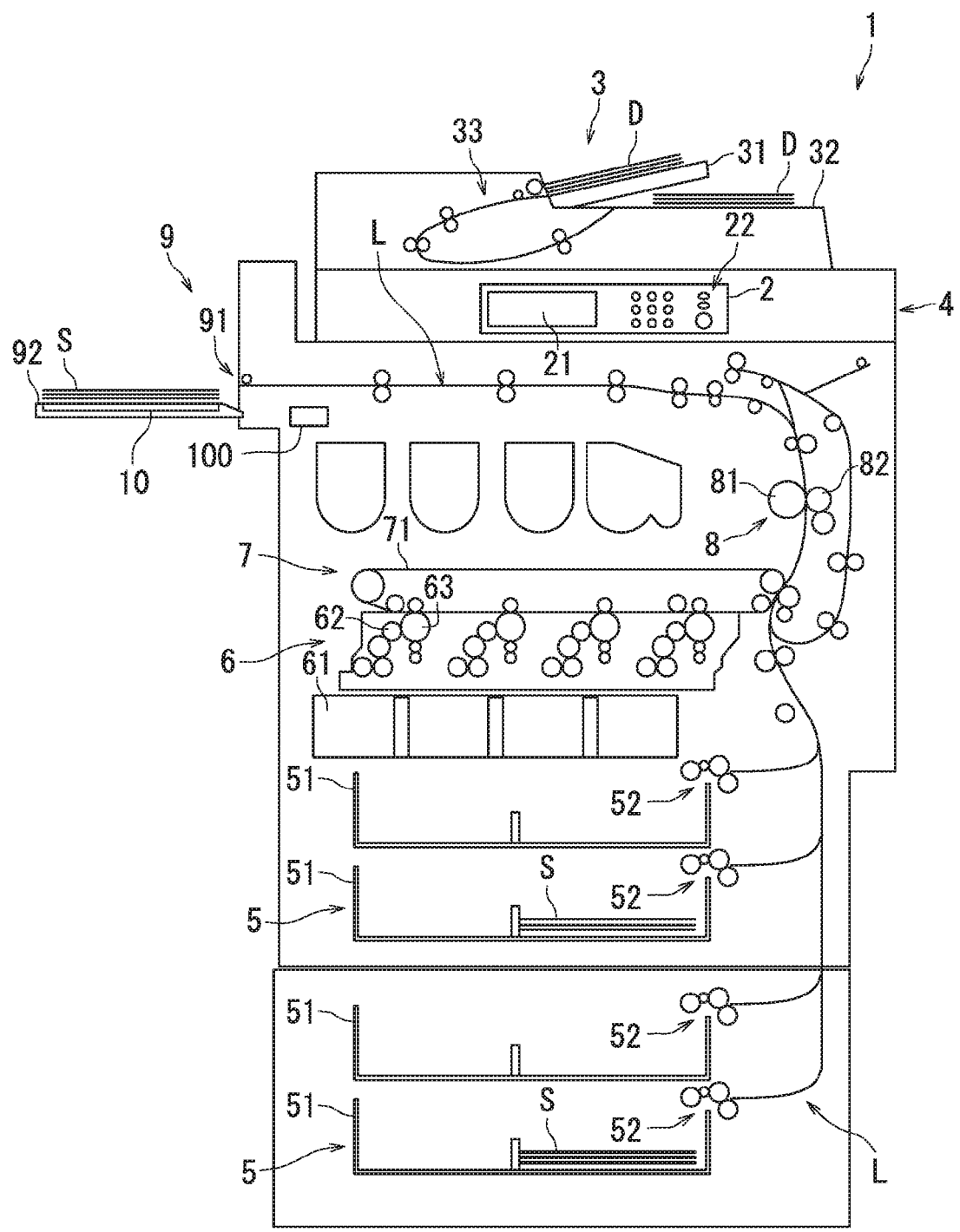
FIG. 1 is a diagram showing configuration of an image forming apparatus according to a first embodiment of this disclosure.

Hereinafer, image forming apparatuses and logout methods according to embodiments of this disclosure will be described with reference to the drawings. Note that, in the drawings, the same or corresponding portions are provided with the same reference numerals and thus their description will not be repeated.

First Embodiment

First, with reference to FIG. 1, configuration of the image forming apparatus 1 will be described. FIG. 1 is a diagram showing the configuration of the image forming apparatus 1. In this embodiment, the image forming apparatus 1 is an electrophotographic multifunction peripheral.

As shown in FIG. 1, the image forming apparatus 1 includes: a conveyance section L, an operation section 2, a document conveyance device 3, a scanner 4, a paper feed section 5, an image forming section 6, a transfer section 7, a fixing section 8, an ejecting section 9, a sensor 10, and a controller 100.

The conveyance section L conveys a sheet S from the paper feed section 5 to the ejecting section 9.

The operation section 2 accepts input operation performed by the user, and transmits a signal in accordance with the input operation to the controller 100. The operation section 2 includes a liquid crystal display 21. The liquid crystal display 21 displays a setting menu, results of a process performed by the controller 100, etc. Moreover, the operation section 2 further includes a plurality of operation buttons 22 such as numeric keys, a start key, and a cancel key. The user can operate the operation buttons 22 to thereby input information related to print jobs such as a number of prints. Moreover, upon pressing of the start key by the user, the operation section 2 transmits an input signal indicating job start to the controller 100. The user can operate the operation section 2 to thereby execute login operation and logout operation.

The document conveyance device 3 includes: a document loading tray 31, a document exit tray 32, and a document conveyance section 33. The document conveyance section 33 individually conveys sheet-like documents D loaded on the document loading tray 31 to the document exit tray 32. More specifically, the document conveyance section 33 conveys the document D to the document exit tray 32 via a reading position. The reading position is a position Which permits the scanner 4 to read an image of the document D conveyed by the document conveyance device 3.

The scanner 4 includes contact glass and a reading mechanism. The contact glass is arranged at a top of the scanner 4 and faces a bottom surface of the document conveyance device 3. The reading mechanism includes: a carriage moving a light source in a sub-scanning direction; an optical system, and an image sensor. The light source irradiates light to the document D loaded on the contact glass while being moved in the sub-scanning direction by the carriage. The optical system guides the light reflected from the document D to the image sensor. The image sensor converts the light guided by the optical system into an electric signal and outputs it. The scanner 4 generates image data based on the output of the image sensor, Then the generated image data is transmitted to the controller 100. Moreover, upon reading of the document D, which has been conveyed by the document conveyance device 3, by the scanner 4, the light source irradiates light to the reading position. As a result, the image data corresponding to an image of the document D conveyed by the document conveyance device 3 is transmitted to the controller 100.

The paper feed section 5 includes a paper feed cassette 51 and a paper feed roller group 52. The paper feed cassette 51 can store a plurality of sheets S. The paper feed roller group 52 individually feeds the sheets S stored in the paper feed cassette 51 to the conveyance section L.

The image forming section 6 includes: an exposure device 61, developing devices 62, and photosensitive drums 63. The exposure device 61, based on the image data generated by the scanner 4, irradiates the photosensitive drum 63 to form an electrostatic latent image. The developing device 62 supplies a toner to the photosensitive drum 63 and develops the electrostatic latent image formed on the photosensitive drum 63 to form a toner image.

The transfer section 7 includes an intermediate transfer belt 71. The transfer section 7 transfers the toner image formed on the photosensitive drum 63 to the sheet S via the intermediate transfer belt 71. The sheet S on which the toner image has been transferred is conveyed to the fixing section 8.

The fixing section 8 includes a heating member 81 and a pressure member 82. Through heating of the sheet S by the heating member 81 and pressurizing it by the pressure member 82, the non-fixed toner image is fixed on the sheet S.

The ejecting section 9 includes an ejecting port 91 and an ejecting tray 92. The sheet S is ejected to an outside of the image forming apparatus 1 via the ejecting port 91 formed on a housing side surface of the image forming apparatus 1. The ejected sheet S is loaded onto the ejecting tray 92. In this embodiment, a plurality of sheets S can be loaded on the ejecting tray 92.

The sensor 10 measures overall weight of the sheet/sheets S loaded on the ejecting tray 92. The sensor 10 is, for example, a weight sensor.

The controller 100 is composed of: for example, a central processing unit (CPU), an application specific integrated circuit (ASIC), etc. The controller 100 controls operation of various sections of the image forming apparatus 1. In this embodiment, the controller 100, upon reception of the input signal of the job start transmitted from the operation section 2, operates the various section of the image forming apparatus 1 to execute the job.

Figure 2:
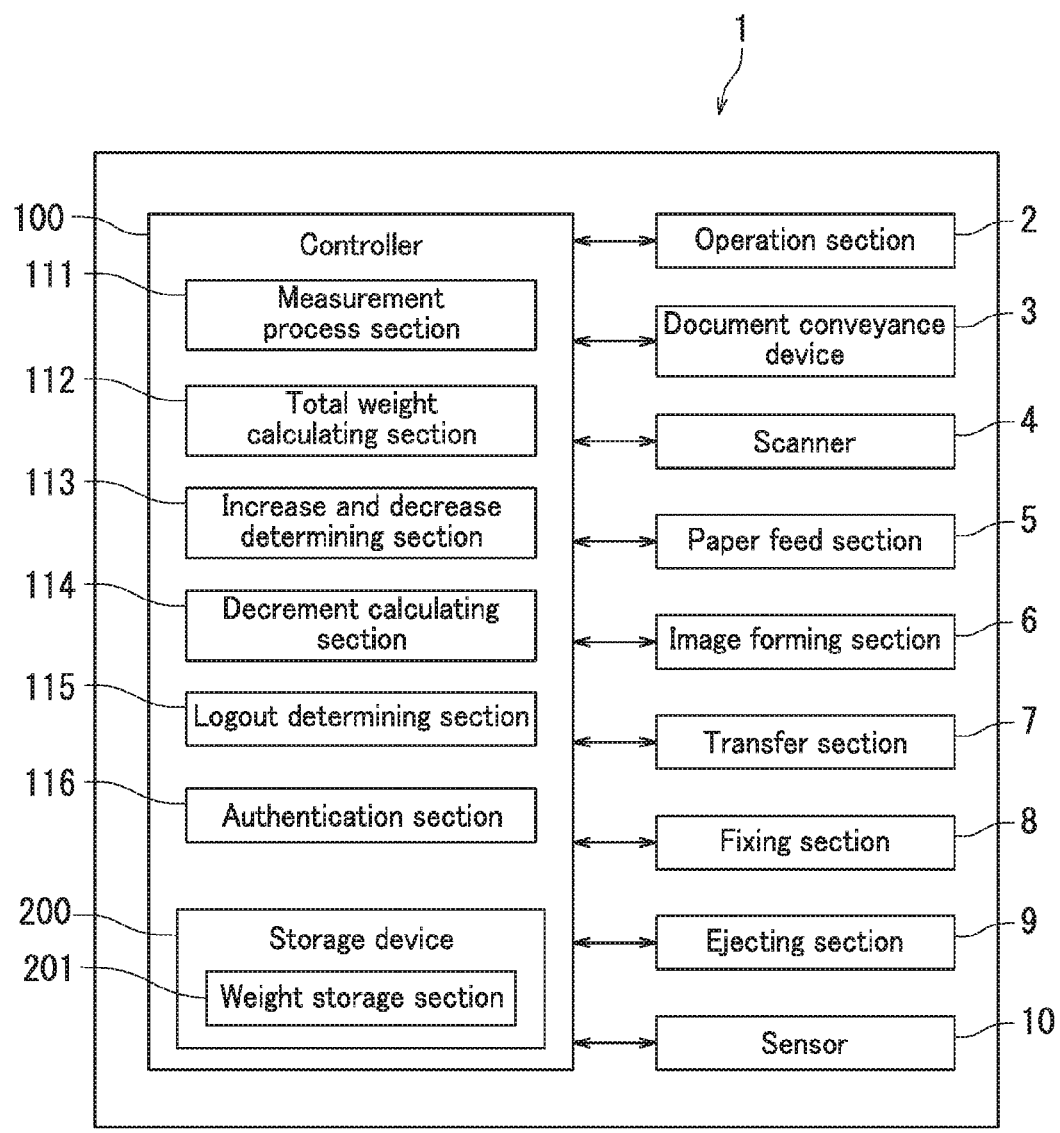
FIG. 2 is a block diagram showing the configuration of the image forming apparatus according to the first embodiment of this disclosure.

Next, with reference to FIG. 2, configuration of the controller 100 will be described in detail. FIG. 2 is a block diagram showing the configuration of the image forming apparatus 1. As shown in FIG. 2, the controller 100 further includes a storage device 200. In this embodiment, the controller 100 executes a program stored in the storage device 200 and thereby functions as a measurement process section 111, a total weight calculating section 112, an increase and decrease determining section 113, a decrement calculating section 114, a logout determining section 115, and an authentication section 116. Moreover, the controller 100 executes a control program previously stored in the storage device 200 to thereby control the operation of the various sections of the image forming apparatus 1.

The measurement process section 111 detects a change in the overall weight of the sheet/sheets S measured by the sensor 10.

The total weight calculating section 112 calculates total weight of the sheet/sheets S loaded on the ejecting tray 92 through job execution.

The increase and decrease determining section 113, upon the detection of the change in the overall weight of the sheet/sheets S by the measurement process section 111, determines whether or not the overall weight has decreased.

The decrement calculating section 114, upon determination by the increase and decrease determining section 113 that the overall weight has decreased, calculates decrement from the overall weight measured by the sensor 10 upon completion of the job. More specifically, the decrement calculating section 114 subtracts, from the overall weight of the sheet/sheets S upon the completion of the job, the overall weight of the sheet/sheets S upon the determination by the increase and decrease determining section 113 that the overall weight has decreased. Hereinafter, the overall weight of the sheet/sheets S upon the completion of the job is described as weight after job execution.

The logout determining section 115 determines whether or not the decrement calculated by the decrement calculating section 114 is equal to the total weight calculated by the total weight calculating section 112.

The authentication section 116 performs a login process and a logout process. In this embodiment, upon determination by the logout determining section 115 that the decrement is equal to the total weight, the authentication section 116 executes the logout process.

The storage device 200 stores setting information, etc. The storage device 200 is composed of: a hard disk drive (HDD), a random access memory (RAM), and a read only memory (ROM).

Moreover, the storage device 200 includes a weight storage section 201. The weight storage section 201 stores the overall weight of the sheet/sheets S loaded on the ejecting tray 92. In this embodiment, the weight storage section 201 stores weight before job execution and the weight after job execution. The weight before job execution is overall weight of the sheet/sheets S measured by the sensor 10 upon the job start. In this embodiment, the total weight calculating section 112 calculates the total weight based on the weight before job execution and the weight after job execution. More specifically, the total weight calculating section 112 subtracts the weight before job execution from the weight after job execution to calculate the total weight.

Figure 3A:
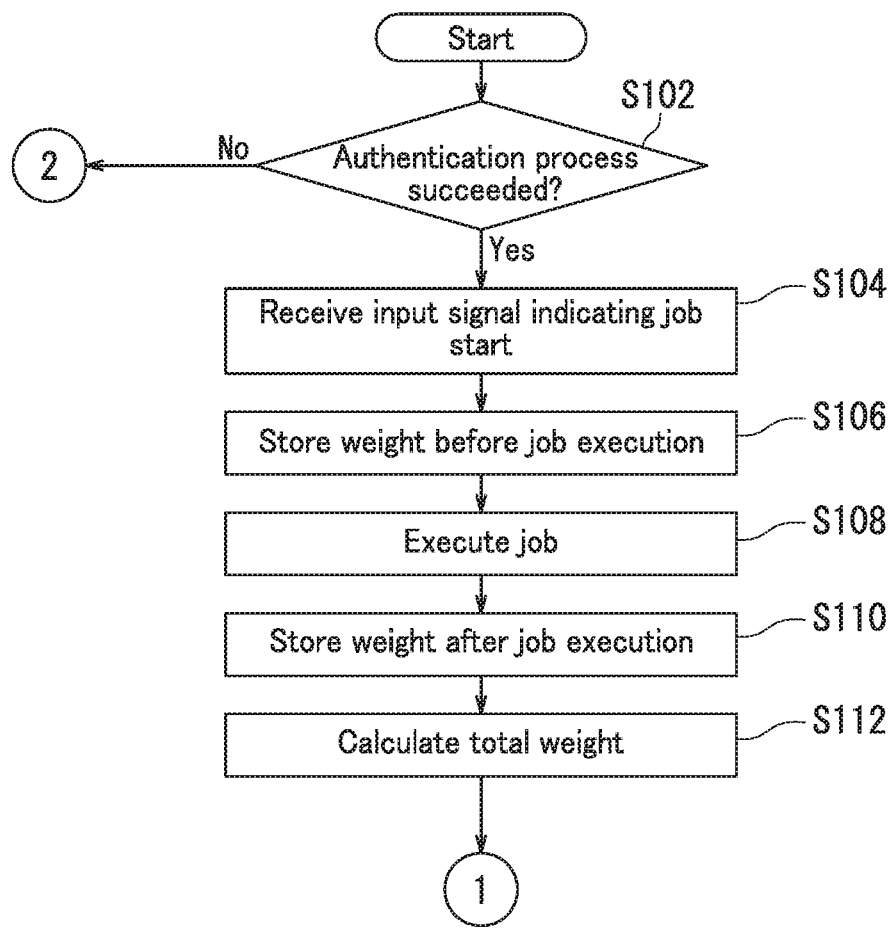
FIG. 3A is a flowchart showing operation of the image forming apparatus according to the first embodiment of this disclosure.
Figure 3B:
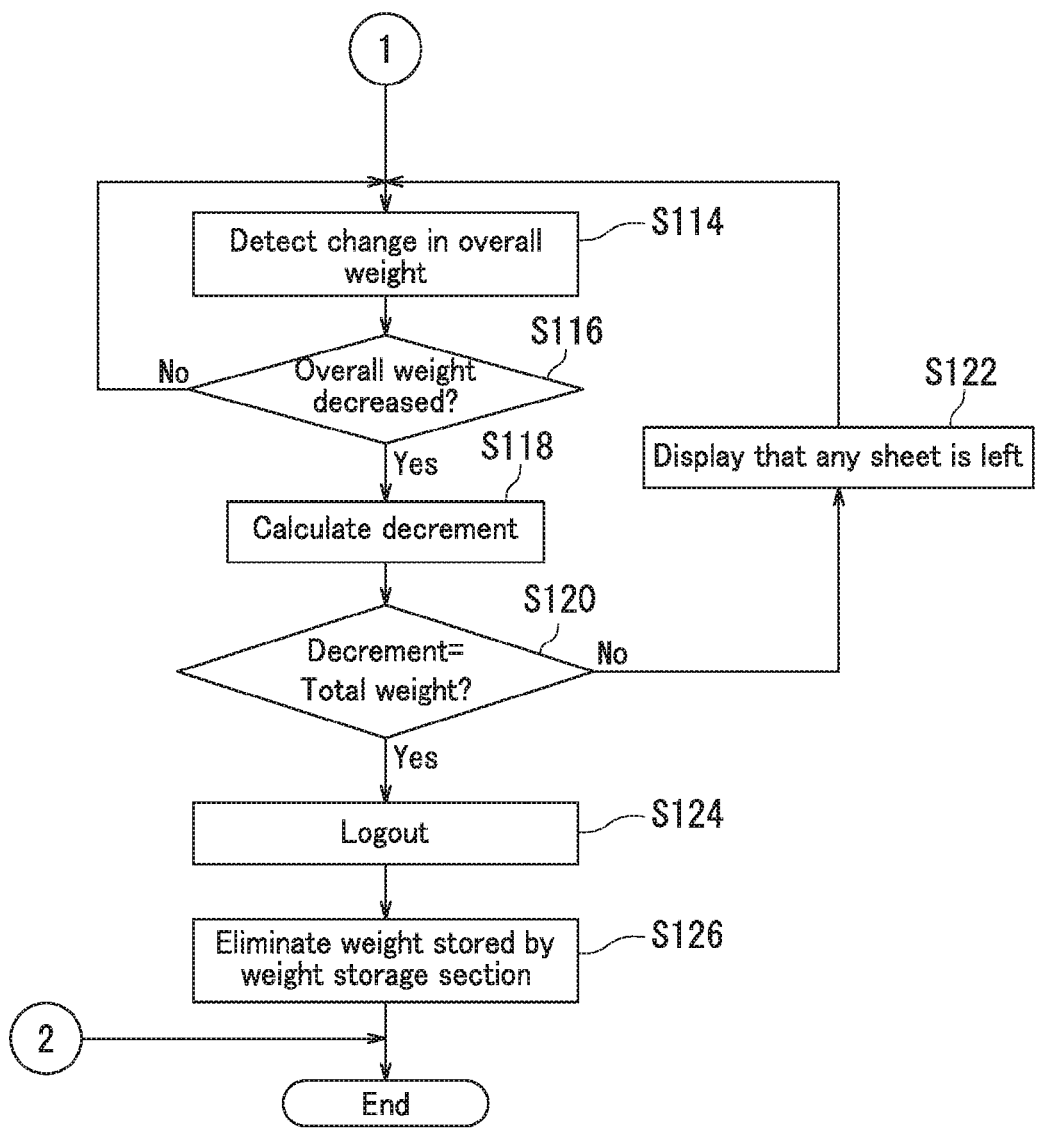
FIG. 3B is a flowchart showing operation of the image forming apparatus according to the first embodiment of this disclosure

Next, with reference to FIGS. 3A and 3B, operation (logout method) of the image forming apparatus 1 according to the first embodiment will be described. FIGS. 3A and 3B are flowcharts showing the operation of the image forming apparatus 1.

As shown in FIGS. 3A and 3B, upon inputting of a login ID and a password by the user, an authentication process is executed by the authentication section 116 (step S102). If the authentication process has failed (No in step S102), the process ends. On the other hand, if the authentication process has succeeded (Yes in step S102), the controller 100 waits for the input signal indicating the job start. Upon reception of the input signal indicating the job start by the controller 100 (step S104), the controller 100 stores the value measured by the sensor 10 as the weight before job execution into the weight storage section 201 (step S106). Next, the controller 100 operates the various sections of the image forming apparatus 1 to execute the job (step S108).

Upon the completion of the job, the controller 100 stores the value measured by the sensor 10 as the weight after job execution into the weight storage section 201 (step S110). Next, the total weight calculating section 112 calculates the total weight (step S112).

Then upon the detection of the change in the overall weight by the measurement process section 111 (step S114), the increase and decrease determining section 113 determines whether or not the overall weight has decreased (step S116). If the increase and decrease determining section 113 has not determined that the overall weight has decreased, that is, if the overall weight has increased (No in step S116), the controller 100 waits for the change in the overall weight to be detected again by the measurement process section 111. On the other hand, if the increase and decrease determining section 113 has determined that the overall weight has decreased (Yes in step S116), the decrement calculating section 114 calculates the decrement (step S118).

The logout determining section 115 determines whether or not the decrement is equal to the total weight (step S120). Upon determination by the logout determining section 115 that the decrement is not equal to the total weight (No in step S120), the controller 100 displays, on the liquid crystal display 21, that any sheet S is left on the ejecting tray 92 (step S122), and waits for the change in the overall weight to be detected again by the measurement process section 111. On the other hand, upon determination by the logout determining section 115 that the decrement is equal to the total weight (Yes in step S120), the authentication section 116 executes the logout process (Yes in step S124). Upon the logout execution, the weight stored in the weight storage section 201 is eliminated from the weight storage section 201 (step S126), and the process shown in FIGS. 3A and 3B ends. In this embodiment, in step S126, the weight before job execution and the weight after job execution are eliminated from the weight storage section 201 (step S126).

Figure 4A:
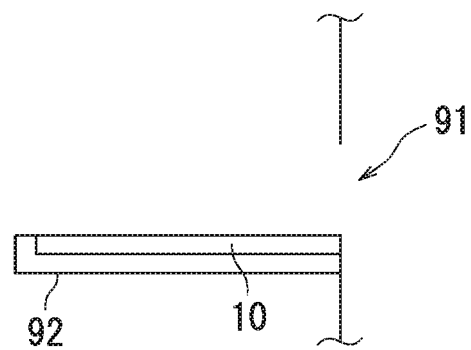
FIG. 4A is a diagram showing a logout method performed in the image forming apparatus according to the first embodiment of this disclosure.
Figure 4B:
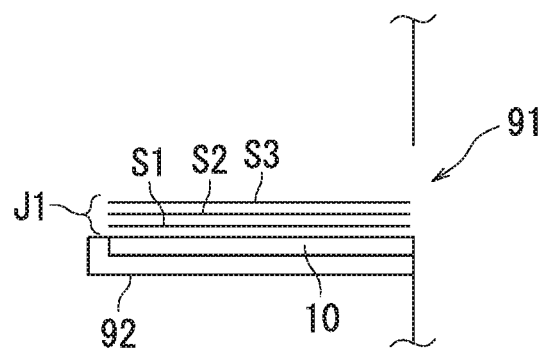
FIG. 4B is a diagram showing the logout method performed in the image forming apparatus according to the first embodiment of this disclosure.
Figure 4C:
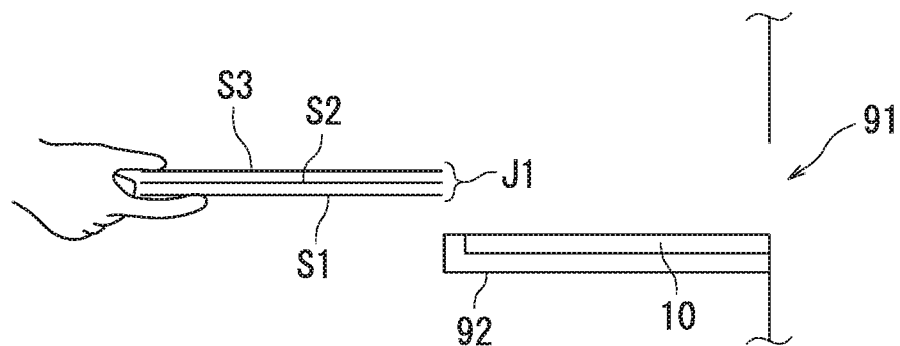
FIG. 4C is a diagram showing the logout method performed in the image forming apparatus according to the first embodiment of this disclosure.
Figure 4D:
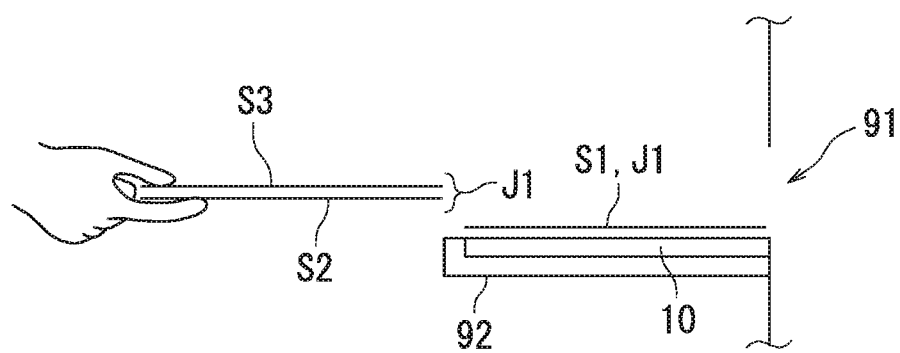
FIG. 4D is a diagram showing the logout method performed in the image forming apparatus according to the first embodiment of this disclosure.

Next, with reference to FIGS. 1-4D, the logout process of the controller 100 according to the first embodiment will be described in detail. Described in FIGS. 4A-4D is an example in which a job J1 is executed and three sheets S are ejected onto the ejecting tray 92. FIG. 4A is a diagram showing a state of the ejecting tray 92 upon start of the job J1. FIG. 4B is a diagram showing a state of the ejecting tray 92 upon completion of the job J1. FIG. 4C is a diagram showing a state in Which all the sheets S loaded on the ejecting tray 92 have been removed from the ejecting tray 92 through the execution of the job J1. FIG. 4D is a diagram showing a state in which part (S2, S3) of the sheets S loaded on the ejecting tray 92 have been removed from the ejecting tray 92 through the execution of the job J1.

Before the start of the job J1, as shown in FIG. 4A, no sheet S is loaded on the ejecting tray 92. The controller 100 stores the value measured by the sensor 10 as the weight before job execution into the weight storage section 201.

Then upon the completion of the job J1, as shown in FIG. 4B, the three sheets S1, S2, and S3 are loaded onto the ejecting tray 92. Thus, the controller 100 stores the value measured by the sensor 10 upon the completion of the job J1 as the weight after job execution into the weight storage section 201. In an example shown in FIG. 4B, weight of the three sheets S is stored as the weight after job execution into the weight storage section 201.

The total weight calculating section 112 calculates the value obtained by subtracting the weight before job execution from the weight after job execution, that is, the total weight. In the example shown in FIG. 4B, a value indicating the weight of the three sheets S is calculated as the total weight.

Then as shown in FIG. 4C, upon the removal of the three sheets S1, S2, and S3 from the ejecting tray 92 by the user, the measurement process section 111 detects the change in the overall weight. Upon the detection of the change in the overall weight by the measurement process section 111, the increase and decrease determining section 113 determines whether or not the overall weight has decreased. In an example shown in FIG. 4C, the overall weight has decreased. Thus, the increase and decrease determining section 113 determines that the overall weight has decreased, and the decrement calculating section 114 calculates the weight of the three sheets S as the decrement. Then the logout determining section 115 determines whether or not the decrement is equal to the total weight. In the example shown in FIG. 4C, the decrement (the weight of the three sheets S) is equal to the total weight (the weight of the three sheets S). Thus, the logout determining section 115 determines that the decrement is equal to the total weight. As a result, the e authentication section 116 executes the logout process.

As shown in FIG. 4D, upon the removal of the two sheets S2 and S3 of the three sheets S1, S2, and S3 from the ejecting tray 92 by the user, as is with a case described with reference to FIG. 4C, the increase and decrease determining section 113 determines that the overall weight has decreased. In an example shown in FIG. 4D, the decrement calculating section 114 calculates weight of the two sheets S as the decrement. Then the logout determining section 115 determines whether or not the decrement is equal to the total weight. In the example shown in FIG. 4D, the decrement (of the two sheets) is not equal to the total weight (of the three sheets). Thus, the logout determining section 115 determines that the decrement is not equal to the total weight. As a result, the controller 100 displays, on the liquid crystal display 21, a message indicating that any sheet S is left on the ejecting tray 92.

The first embodiment of this disclosure has been described above. According to this embodiment, upon the removal of the sheets S1, S2, and S3 loaded on the ejecting tray 92 by the user through the job execution, the logout process is performed. This permits suppression of diminished security attributable to forgetting to perform the logout operation by the user.

Moreover, according to this embodiment, only through the removal of the sheet/sheets S loaded on the ejecting tray 92 by the user through the job execution, the logout process is performed. Thus, the user is no longer required to operate the operation section 2 to perform the logout operation. As a result, user convenience improves.

Moreover, according to this embodiment, in a case where the user forgets to remove the sheet S1, which is part of the sheets S1, S2, and S3 loaded on the ejecting tray 92, from the ejecting tray 92 through the job execution, an error message is displayed on the liquid crystal display 21. This therefore permits suppression of forgetting to take out any sheet S loaded on the ejecting tray 92 as a result of the job executed by himself or herself. Therefore, the user convenience further improves.

Second Embodiment

Next, with reference to FIGS. 1 and 5-7D, the image forming apparatus 1 according to the second embodiment of this disclosure will be described. The second embodiment is different from the first embodiment in a method of calculating the total weight by the total weight calculating section 112. Hereinafter, a point of the second embodiment different from that of the first embodiment will be described, and points overlapping with those of the first embodiment will be omitted from the description.

Figure 5:
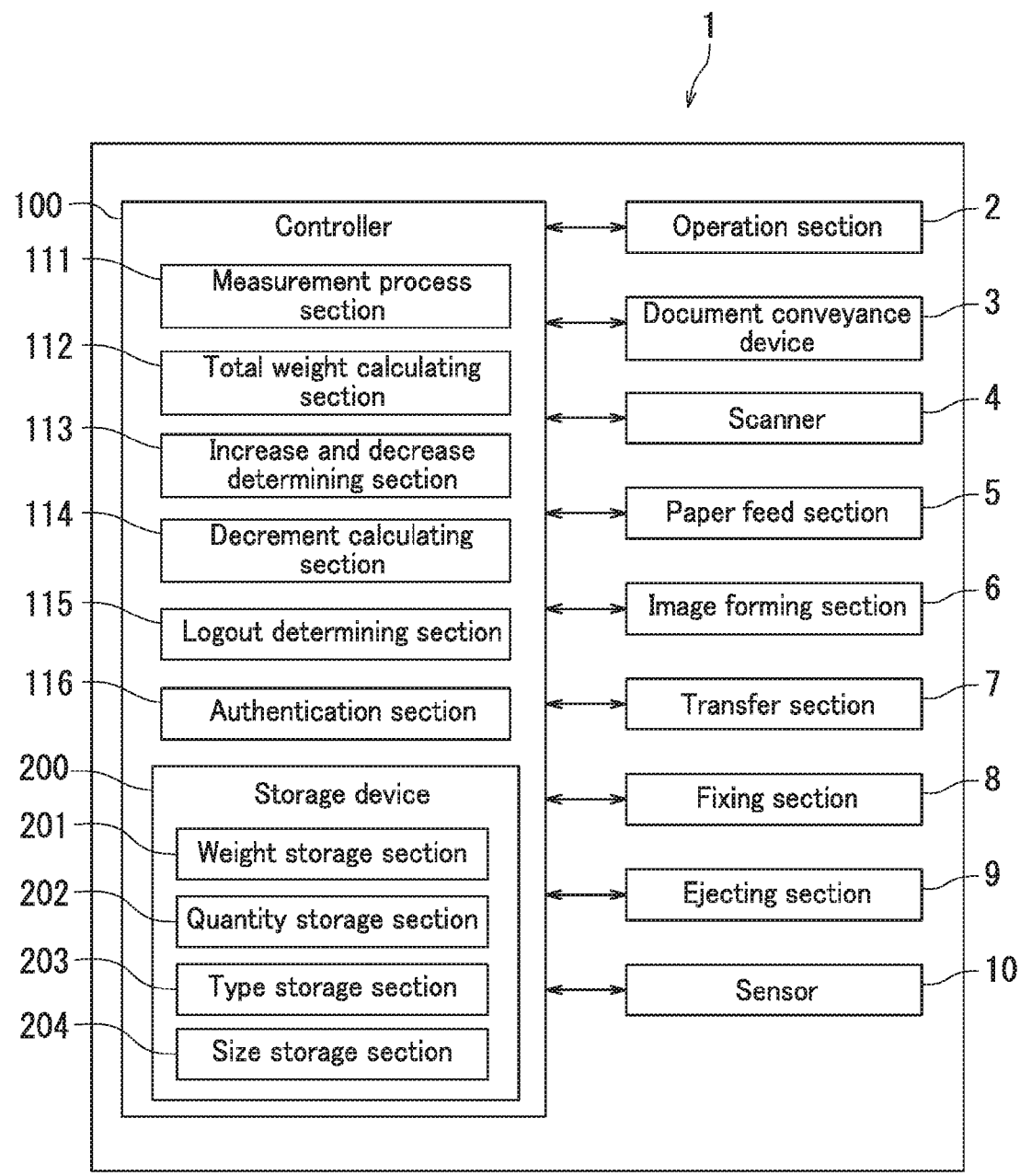
FIG. 5 is a block diagram showing configuration of an image forming apparatus according to a second embodiment of this disclosure.

As shown in FIG. 5, the storage device 200 further includes, in addition to the weight storage section 201, a quantity storage section 202, a type storage section 203 and a size storage section 204.

In this embodiment, the weight storage section 201 stores only the weight after job execution.

The quantity storage section 202 stores a quantity of the sheet/sheets S loaded on the ejecting tray 92 through the job execution. Hereinafter, the quantity of the sheet/sheets S loaded on the ejecting tray 92 through the job execution is described as a job quantity. In this embodiment, the job quantity is obtained by multiplying a number of document/documents D and a number of prints by the controller 100. The number of document/documents D is obtained by, for example, counting the number of document/documents conveyed by the document conveyance section 33. The number of document/documents D conveyed by the document conveyance section 33 is counted by the controller 100. The controller 100 counts the number of document/documents D based on a signal indicating detection of the document/documents D from the sensor provided on a document conveying path of the document conveyance section 33. The sensor provided on the document conveying path of the document conveyance section 33 is, for example, a transmission-type sensor. The number of print/prints is inputted by operating the operation section 2 before staring the job by the user. The controller 100 stores the calculated job quantity into the quantity storage section 202. Note that in a case where the job has been started without inputting the number of print/prints by the user, the job quantity is calculated by use of a default number of print/prints previously stored in the storage device 200.

The type storage section 203 stores a sheet type of the sheet/sheets S loaded on the ejecting tray 92 through the job execution. In this embodiment, before starting the job, the user operates the operation section 2 to input information indicating the sheet type. As a result, the sheet type is stored into the type storage section 203. In a case where the job has been started without inputting the information indicating the sheet type by the user, a default sheet type previously stored in the storage device 200 is stored into the type storage section 203. The sheet type indicates, for example, cardboard or plain paper.

The size storage section 204 stores a sheet size of the sheet S loaded on the ejecting tray 92 through the job execution. In this embodiment, before starting the job, the user operates the operation section 2 to input information indicating the sheet size. As a result, the sheet size is stored into the size storage section 204. In a case where the job has been started without inputting the information indicating the sheet size by the user, for the sheet size, a sheet size of the document/documents D loaded on the contact glass or the document loading tray 31 is detected. The detected sheet size is stored into the size storage section 204. The sheet size indicates, for example, either of an A4 size and at B5 size.

The total weight calculating section 112 calculates the total weight based on the job quantity stored in the quantity storage section 202, the sheet type stored in the type storage section 203, and the sheet size stored in the size storage section 204. More specifically, the total weight tm is obtained by formula (1). Assumed is that weight per unit area of each sheet S corresponding to the sheet type is constant.

$$Tm = X \times Y \times Z \qquad \text{(Formula 1)}.$$

In formula (1), X denotes an area of the sheet S, Y denotes the weight per unit area of the sheet S, and Z denotes the job quantity stored in the quantity storage section 202. The area of the sheet S is acquired based on the sheet size stored in the size storage section 204. More specifically, the storage device 200 previously stores the area for each sheet size as a size area list. The total weight calculating section 112 acquires the area corresponding to the sheet size stored in the size storage section 204 from the size area list. Moreover, the weight per unit area of the sheet S is acquired based on the sheet type stored in the type storage section 203. More specifically, the storage device 200 previously stores the weight per unit area for each sheet type as a unit area list. The total weight calculating section 112 acquires the weight per unit area corresponding to the sheet type stored in the type storage section 203 from the unit area list.

The authentication section 116, upon determination by the logout determining section 115 that the decrement calculated by the decrement calculating section 114 is equal to the total weight tm, executes logout process.

Figure 6A:
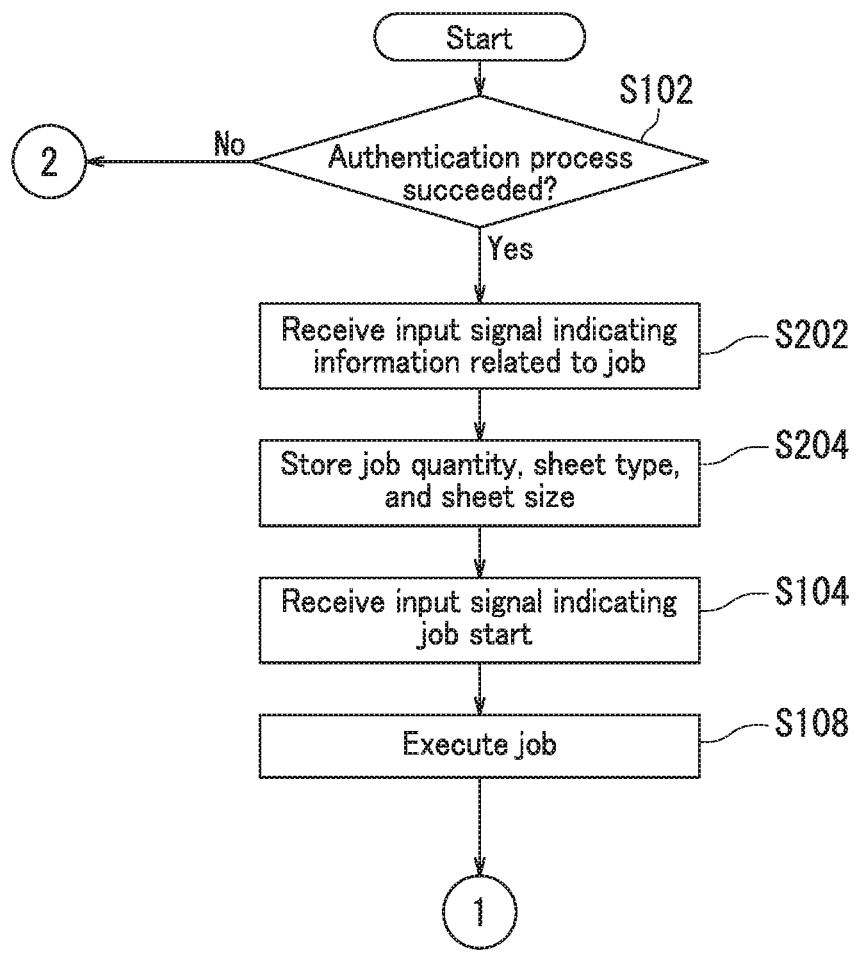
FIG. 6A is a flowchart showing operation of the image forming apparatus according to the second embodiment of this disclosure.
Figure 6B:
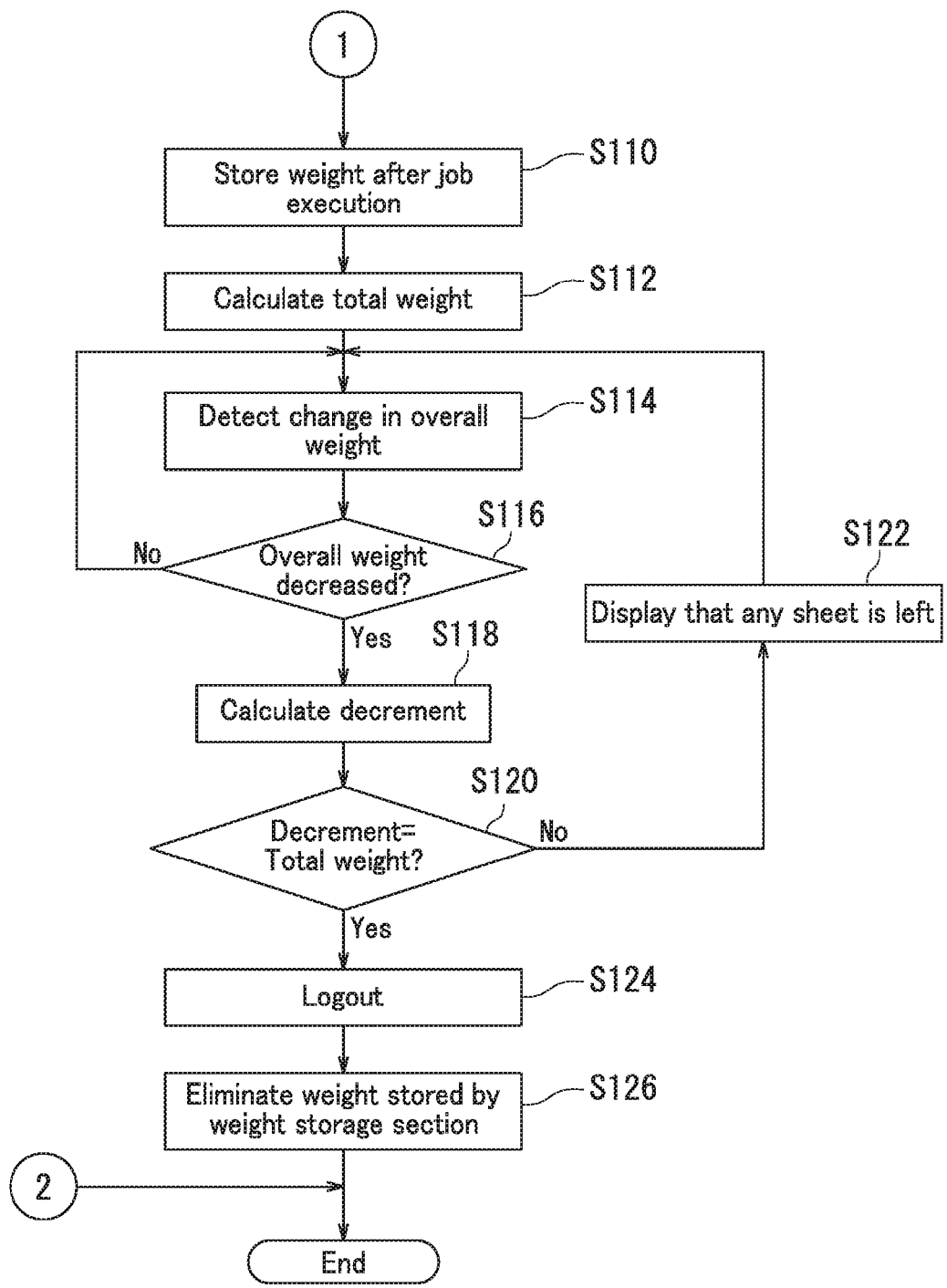
FIG. 6B is a flowchart showing operation of the image forming apparatus according to the second embodiment of this disclosure.

Next, with reference to FIGS. 6A and 6B, operation (a logout method) of the image forming apparatus 1 according to the second embodiment will be described. FIGS. 6A and 6B are flowcharts showing the operation of the image forming apparatus 1 according to the second embodiment. As shown in FIGS. 6A and 6B, compared to the first embodiment (see FIGS. 3A and 3B), step S202 and step S204 are added between step S102 and step S104. Moreover step S106 described in the first embodiment is not executed. That is, the weight before job execution is not stored in the weight storage section 201. In the second embodiment, the total weight calculating section 112 does not calculate the total weight based on the weight before job execution and the weight after job execution but calculates the total weight based on the job quantity, the sheet type, and the sheet size. In processes shown in FIGS. 6A and 6B, before the job is started, an input signal indicating information related to the print job (the number of prints, the sheet type, and the sheet size) is transmitted to the controller 100.

After success in the authentication process (Yes in step S102), upon reception of the input signal indicating the information related to the print job (step S202), the controller 100 stores the job quantity into the quantity storage section 202, stores the sheet type into the type storage section 203, and stores the sheet size into the size storage section 204 (step S204).

Then upon reception of an input signal indicating job start (step S104), the controller 100 operates the various sections of the image forming apparatus 1 to execute the job (step S108). Then the total weight calculating section 112, based on the job quantity stored in the quantity storage section 202, the sheet type stored in the type storage section 203, and the sheet size stored in the size storage section 204, performs calculation of the total weight (step S112). The processes in and after step S114 are the same as those of the first embodiment, and thus are omitted from the description.

Next, with reference to FIGS. 1 and 5-7D, the logout process of the controller 100 according to the second embodiment will be described in detail. Described in FIGS. 7A-7D is an example in which four sheets S (S11, S12, S13, and S14) are loaded onto the ejecting tray 92. More specifically, described is a case where interruption of a job J12 is caused by another user during the execution of a job J11 by a given user. More specifically, three A4-sized plain sheets (sheets S11, S12, and S14) are ejected onto the ejecting tray 92 through the execution of the job J11. Moreover, one A4-sized cardboard (sheet S13) is ejected onto the ejecting tray 92 through execution of the job J12. In the examples shown in FIGS. 7A-7D, after the sheets S11 and 512 are ejected onto the ejecting tray 92 through the execution of the J11, the sheet S13 is ejected onto the ejecting tray 92 through the execution of the job J12 (Interruption). Then the sheet S14 is ejected onto the ejecting tray 92.

The total weight calculating section 112 calculates the total weight (weight of the three A4-sized plain sheets) based on the job quantity (three sheets) stored in the quantity storage section 202, the sheet type (plain sheet) stored in the type storage section 203, and the sheet size (A4 size) stored in the size storage section 204.

Figure 7A:
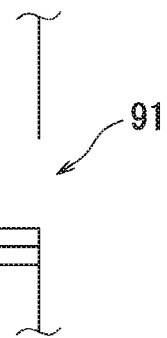
FIG. 7A is a diagram showing a logout method performed in the image forming apparatus according to the second embodiment of this disclosure.
Figure 7B:
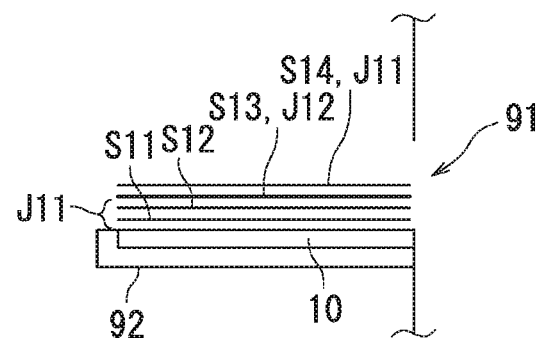
FIG. 7B is a diagram showing the logout method performed in the image forming apparatus according to the second embodiment of this disclosure.
Figure 7C:
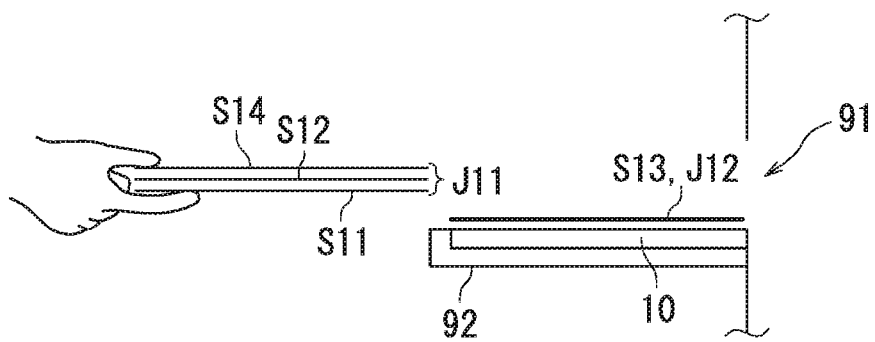
FIG. 7C is a diagram showing the logout method performed in the image forming apparatus according to the second embodiment of this disclosure.
Figure 7D:
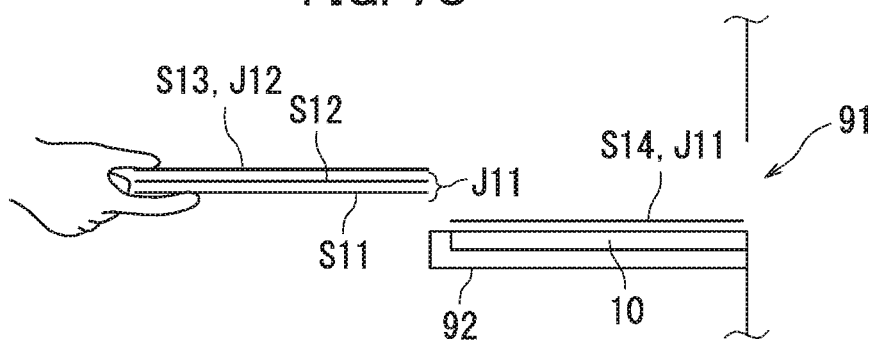
FIG. 7D is a diagram showing the logout method performed in the image forming apparatus according to the second embodiment of this disclosure.

FIG. 7A is a diagram showing a state of the ejecting tray 92 upon the start of the job J11. FIG. 7B is a diagram showing a state of the ejecting tray 92 upon completion of the job J11. FIG. 7C is a diagram showing a state in which all the sheets S loaded onto the ejecting tray 92 through the exertion of the job J11 have been removed from the ejecting tray 92. FIG. 7D is a diagram showing a state in which part of the sheets S loaded onto the ejecting tray 92 through the execution of the job J11 have been removed from the ejecting tray 92.

Before the start of the job J11, as shown in FIG. 7A, no sheet S is loaded on the ejecting tray 92.

Then after the completion of the job J11, as shown in FIG. 7B, the four sheets S11, S12, S13, and S14 are loaded onto the ejecting tray 92.

Then as shown in FIG. 7C, upon the removal of the three sheets S11, S12, and S14 from the ejecting tray 92, the measurement process section 111 detects a change in the overall weight. Upon the detection of the change in the overall weight by the measurement process section 111, the increase and decrease determining section 113 determines whether or not the overall weight has decreased. In an example shown in FIG. 7C, the overall weight has decreased. Thus, the increase and decrease determining section 113 determines that the overall weight has decreased, and the decrement calculating section 114 calculates weight of the three A4-sized plain sheets as decrement. Then the logout determining section 115 determines whether or not the decrement is equal to the total weight. In the example shown in FIG. 7C, the decrement (the weight of the three A4-sized plain sheets) is equal to the total weight (the weight of the three A4-sized plain sheets). Thus, the logout determining section 115 determines that the decrement is equal to the total weight. As a result, the authentication section 116 executes the logout process.

As shown in FIG. 7D, upon removal of the two sheets S11 and S12 included in the three sheets S11, S12, and S14 of the job J11 and the sheet S13 of the job J12 from the ejecting tray 92, as is with the case described with reference to FIG. 7C, the increase and decrease determining section 113 determines that the overall weight has decreased. In an example shown in FIG. 7D, the decrement calculating section 114 calculates, as the decrement, a value obtained by summing the weight of the two A4-sized plain sheets and the weight of the one A4-sized cardboard. Then the logout determining section 115 determines whether or not the decrement is equal to the total weight. In the example shown in FIG. 7D, it is determined that the decrement (a total value of the weight of the two A4-sized plain sheets and the weight of one A4-sized cardboard) is not equal to the total weight (the weight of the three A4-sized plain sheets), As a result, the controller 100 displays, on the liquid crystal display 21, a message indicating that any sheet S is left on the ejecting tray 92.

The second embodiment of this disclosure has been described above. According to this embodiment, the total weight calculating section 112 calculates the total weight without use of the weight before job execution. That is, the total weight calculating section 112 can calculate the total weight without subtracting the weight before job execution from the weight after job execution. The total weight is calculated based on the job quantity stored in the quantity storage section 202, the sheet type stored in the type storage section 203, and the sheet size stored in the size storage section 204. Thus, even in a case where the sheet S13 has been loaded onto the ejecting tray 92 through the execution of the job J12 (interruption) by another user during the execution of the job J11 by the given user, the logout process is performed by removing the sheets S11, S12, and S14 loaded on the ejecting tray 92 through the execution of his or her own job J11 by a given user. This permits suppression of the diminished security.

In this embodiment, the sheet type is stored into the type storage section 203 through input operation by the user, but this disclosure is not limited to this. For example, the sheet type of the sheet/sheets S stored in the paper feed cassette 51 may be determined by a media sensor.

The embodiments of this disclosure have been described above with reference to the drawings (FIGS. 1-7D). However, this disclosure is not limited to the embodiments described above, and various modes can be carried out without departing from the spirits of this disclosure.

For example, in the embodiments of this disclosure, the sensor 10 measures the overall weight of the sheet/sheets S loaded on the ejecting tray 92, but this disclosure is not limited to this. For example, the sensor 10 may measure overall weight of the documents D loaded on the document exit tray 32. In this case, the total weight calculating section 112 calculates the total weight of the document/documents D loaded on the document exit tray 32 through job execution.

Moreover, in the embodiments of this disclosure, described as an example is a case where this disclosure is applied to an electrophotographic image forming apparatus, but this disclosure is not limited to this. For example, this disclosure can also be applied to an image forming apparatus of an inkjet type.

What is claimed is:

1. An image forming apparatus executing a job based on a job request, the image forming apparatus comprising:
    a housing;
    an ejecting tray;
    a controller calculating first weight indicating total weight of at least one sheet ejected from the housing onto the ejecting tray through execution of the job; and
    a sensor measuring second weight indicating total weight of at least one sheet on the ejecting tray;
    wherein
    the controller
        determines whether or not the second weight measured by the sensor has decreased after completion of the job,
        upon determining that the second weight has decreased, calculates decrement of the second weight, and
        executes a logout process upon determining that the decrement is equal to the first weight.

2. The image forming apparatus according to claim 1, further comprising
    a storage section storing weight before job execution measured by the sensor upon start of the job and weight after job execution measured by the sensor upon the completion of the job, wherein
    the controller subtracts the weight before job execution from the weight after job execution to calculate the first weight.

3. The image forming apparatus according to claim 1, further comprising
    a storage device storing a sheet quantity indicating a quantity of the at least one sheet ejected from the housing onto the ejecting tray through the execution of the job, and
    the controller calculates the first weight based on weight per one sheet of the at least one sheet and the sheet quantity stored in the storage device.

4. The image forming apparatus according to claim 3, wherein
    the storage device further stores a type of the at least one sheet, and
    the controller calculates the weight per one sheet of the at least one sheet based on the type of the at least one sheet stored in the storage device.

5. The image forming apparatus according to claim 1, further comprising
    an image forming section forming an image on at least one sheet based on the job request, wherein
    the housing includes a first housing accommodating the image forming section,
    onto the ejecting tray, the at least one sheet on which the image has been formed by the image forming section is ejected from the first housing, and
    the first weight indicates total weight of the at least one sheet ejected from the first housing onto the ejecting tray through the execution of the job.

6. The image forming apparatus according to claim 1, further comprising:
    a sheet conveyance section conveying at least one sheet based on the job request; and
    a scanner reading an image formed on the at least one sheet conveyed by the sheet conveyance section, wherein
    the housing includes a second housing accommodating the sheet conveyance section, onto the ejecting tray, the at least one sheet of which image has been read by the scanner is ejected from the second housing, and
    the first weight indicates total weight of the at least one sheet ejected from the second housing onto the ejecting tray through the execution of the job.

7. A logout method comprising:
    ejecting at least one sheet from a housing onto an ejecting tray through execution of a job;
    calculating first weight indicating total weight of the at least one sheet ejected onto the ejecting tray through the execution of the job;
    determining whether or not second weight indicating total weight of at least one sheet on the ejecting tray has decreased after completion of the job, the second weight being measured by a sensor;
    upon determining that the second weight has decreased, calculating decrement of the second weight;
    determining whether or not the decrement is equal to the first weight; and
    executing a logout process upon determining that the decrement is equal to the first weight.

8. The image forming apparatus according to claim 1, wherein
    the controller notifies an error upon determining that the decrement is not equal to the first weight.

9. The logout method according to claim 7, further comprising
    notifying an error upon determining that the decrement is not equal to the first weight.

* * * * *